N. W. JACOBS.
NUMBER PLATE FOR MOTOR VEHICLE FUEL TANKS.
APPLICATION FILED MAY 6, 1921.
1,423,938.  Patented July 25, 1922.
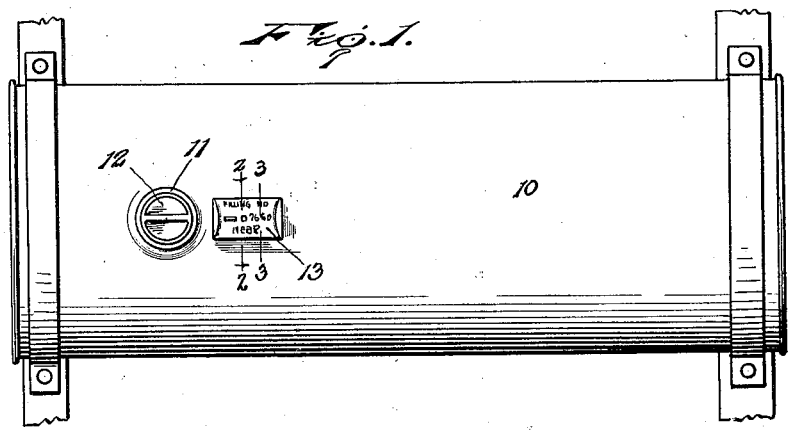
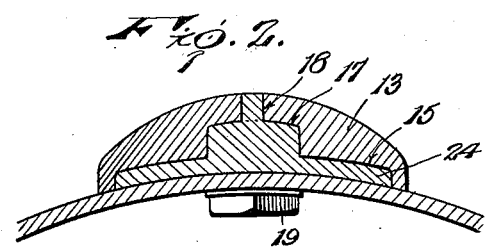
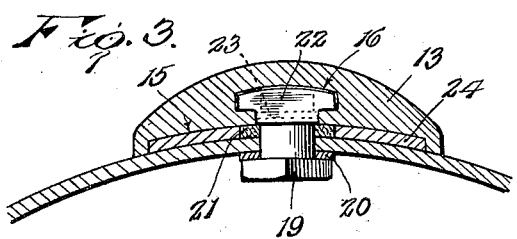
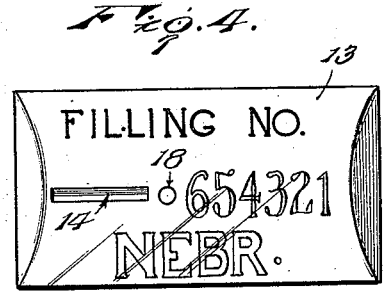
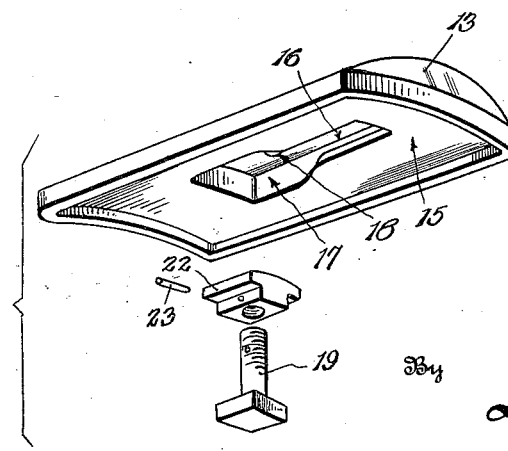
Inventor
N. W. Jacobs.
By Lacey & Lacey, Attorneys

UNITED STATES PATENT OFFICE.

NICHOLAS W. JACOBS, OF STANTON, NEBRASKA.

NUMBER PLATE FOR MOTOR-VEHICLE FUEL TANKS.

1,423,938. Specification of Letters Patent. Patented July 25, 1922.

Application filed May 6, 1921. Serial No. 467,443.

*To all whom it may concern:*

Be it known that I, NICHOLAS W. JACOBS, a citizen of the United States, residing at Stanton, in the county of Stanton and State of Nebraska, have invented certain new and useful Improvements in Number Plates for Motor-Vehicle Fuel Tanks, of which the following is a specification.

This invention relates to an improved number plate for motor vehicle fuel tanks and has as one of its principal objects to provide a device of this character which may be attached to the fuel tank of a vehicle for identifying the vehicle.

The invention has as a further object to provide a number plate which may be readily applied and wherein, after being once applied, it will be practically impossible to remove the plate without puncturing or otherwise seriously injuring the tank.

And the invention has as a still further object to provide a number plate of such character that any attempt to change the number upon the plate may be readily detected.

Other and incidental objects will appear hereinafter.

In the drawing:

Figure 1 is a plan view showing my improved number plate in connection with a motor vehicle fuel tank of conventional design, Figure 2 is a fragmentary transverse section on the line 2—2 of Figure 1, looking in the direction of the arrows, Figure 3 is a view similar to Figure 2, on the line 3—3 of Figure 1, Figure 4 is a plan view of the number plate, and Figure 5 is a detail perspective view showing the parts of the device disassembled.

As previously intimated, the number plate of the present invention is particularly designed for attachment to the fuel tanks of motor vehicles, it being intended that each vehicle shall have an individual number so that when the operator of a vehicle purchases gasoline, the party selling the gasoline may make a record of the number, which may, for convenience, be termed the filling number. As will be appreciated, such records will prove of great value and assistance in the recovery of stolen vehicles. Referring more particularly to the drawing, I have, for convenience, shown the invention in connection with a conventional motor vehicle fuel tank 10, this tank being provided with the usual filling opening 11 normally closed by a cap 12. As will be seen, I employ an oblong plate 13 provided throughout the major portion of its length with a convex upper face in which is formed a medial longitudinally extending groove 14. Opposite this groove the plate carries an individual number, as suggested in Figure 4 of the drawing, while above the number is suitable indicia such as the legend "Filling number," the plate being further provided below the number with the name, or abbreviation of the name, of the State in which the vehicle using the device is licensed. The groove 14 is provided so that additional numerals cannot be added in advance of the number upon the plate for altering the number. Formed in the plate at its lower side is a longitudinally extending recess 15 and opening into this recess is a medially arranged T-slot 16 provided at one end with an enlarged portion 17, the slot extending, as shown in Figure 5, longitudinally of the plate. Formed through the plate to enter the enlarged portion 17 of said slot is an opening 18. In conjunction with the plate I employ a securing bolt 19 which is fitted through the wall of the tank 10 from the inner side thereof, the bolt being preferably located near the filling opening of the tank, and surrounding the bolt within the tank is, as shown in Figure 3, a preferably lead gasket or washer 20. Upon the outer end portion of the bolt is a gasket 21 and threaded upon the bolt is a T-shaped nut 22 secured against displacement by a locking pin 23 extending through the bolt and nut. The nut is, of course, adjusted upon the bolt to coact with the gasket 21 for causing the bolt head to bind against the washer 20 as well as compressing the gasket to form a closed joint between the bolt and the tank and, as will now be observed, the nut is shaped to fit the slot 16 of the plate 13 for connecting the plate with the tank seating flat at its lower side against the tank. In applying the plate, the plate is, of course, first positioned to receive the nut in the enlarged portion 17 of said slot when the plate is then shifted longitudinally to ride over the nut for engaging the plate with the nut. Locking the plate upon the bolt is a filler 24 of babbitt or other approved material, which filler is, when molten, poured into the recess 15 through the opening 18, the filler completely filling said recess and the opening as well as the slot 16 behind the nut 22. The plate is thus permanently secured upon the bolt so that it will be practically impossible to remove the plate without puncturing the tank or otherwise seriously injuring the tank. Thus, as will be seen, after the device is installed, persons intending the theft of the vehicle will find it impractical to attempt removal of the device or to attempt alteration of the number carried thereby so that any records kept of the vehicle by means of said number will furnish an adequate and reliable source of information whereby the whereabouts of the vehicle may be determined.

Having thus described the invention, what is claimed as new is:

1. In a device of the character described, a plate, and fastening means coacting with the plate at one side thereof, the plate being provided with an opening entering through its opposite side whereby means may be introduced through the plate to coact with said fastening means for locking the plate upon the fastening means.

2. In a device of the character described, the combination of a plate provided in one side thereof with a slot, and fastening means engaging in said slot, the plate being provided with an opening leading from said slot through the opposite side of the plate whereby a filling may be introduced into the slot through the opening for locking the block against displacement from said fastening means.

3. The combination with a motor vehicle fuel tank, of a bolt extending through the wall of the tank, a nut upon the outer end of the bolt securing the bolt upon the tank, a plate freely engaged at its inner side with the nut connected thereby with the bolt and fitting the wall of the tank to be closed thereby, and means introduced through the plate to coact with said nut for locking the plate against displacement.

In testimony whereof I affix my signature.

NICHOLAS W. JACOBS. [L. S.]